Figure 1:
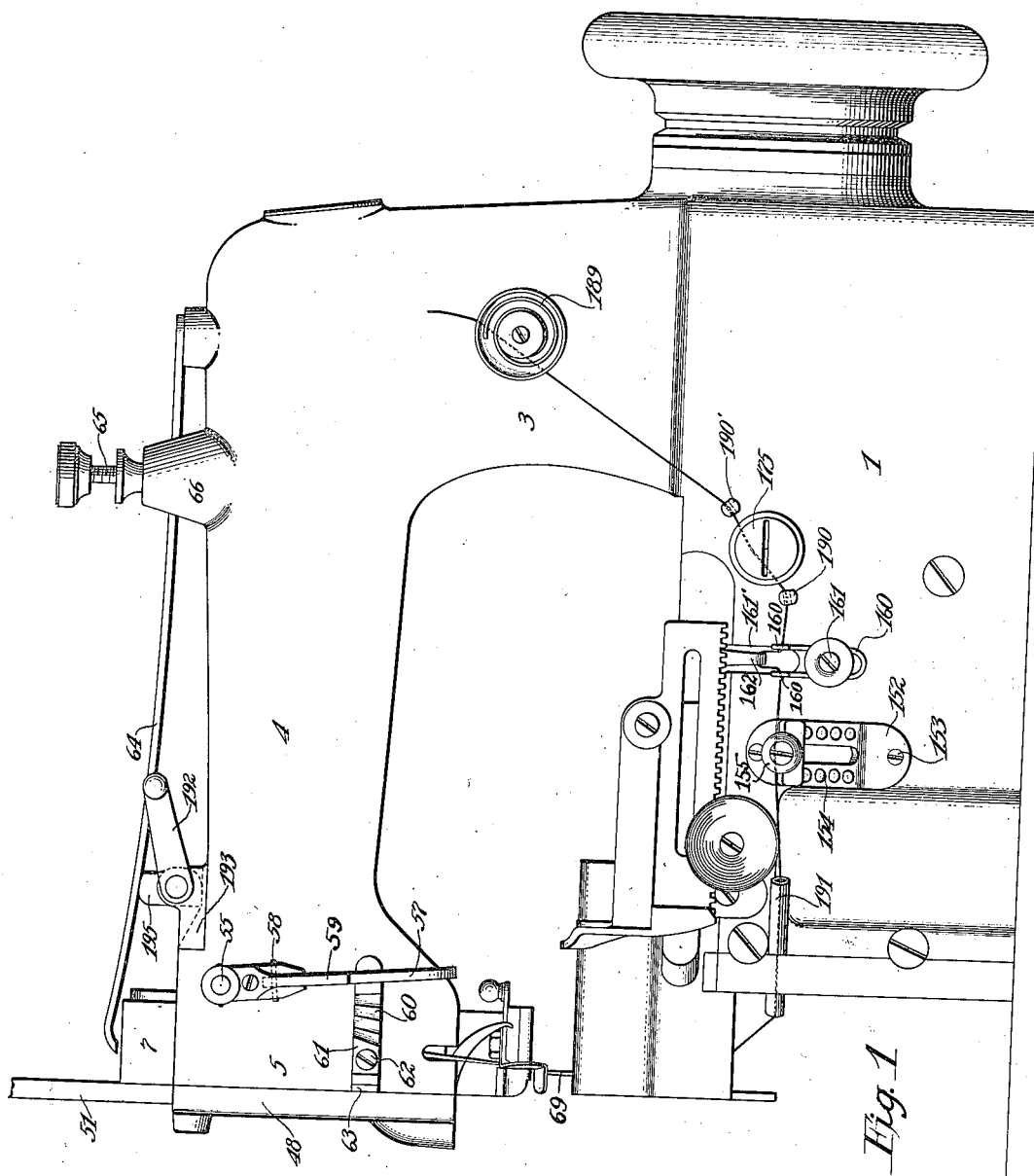

R. BECKER.
STRAW BRAID SEWING MACHINE.
APPLICATION FILED FEB. 1, 1919.

1,429,399.

Patented Sept. 19, 1922.
8 SHEETS—SHEET 1.

WITNESS:
Robert F. Beck

INVENTOR
Rudolph Becker
BY
Henry J. Miller
ATTORNEY

R. BECKER.
STRAW BRAID SEWING MACHINE.
APPLICATION FILED FEB. 1, 1919.

1,429,399.

Patented Sept. 19, 1922.
8 SHEETS—SHEET 5.

WITNESS:
Robert F. Beck.

INVENTOR.
Rudolph Becker,
BY
Henry J. Miller
ATTORNEY

R. BECKER.
STRAW BRAID SEWING MACHINE.
APPLICATION FILED FEB. 1, 1919.
1,429,399.
Patented Sept. 19, 1922.
8 SHEETS—SHEET 6.
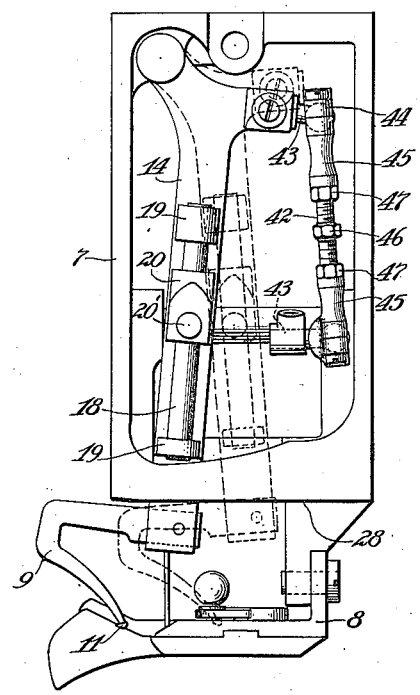
Fig. 7
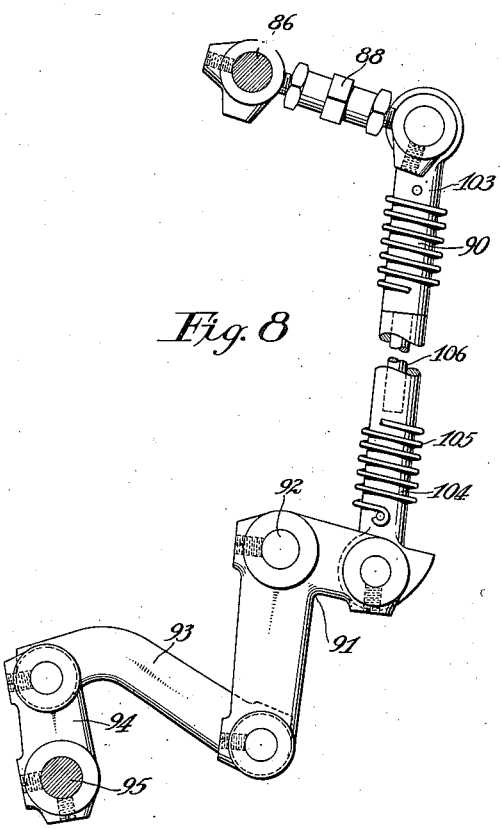
Fig. 8
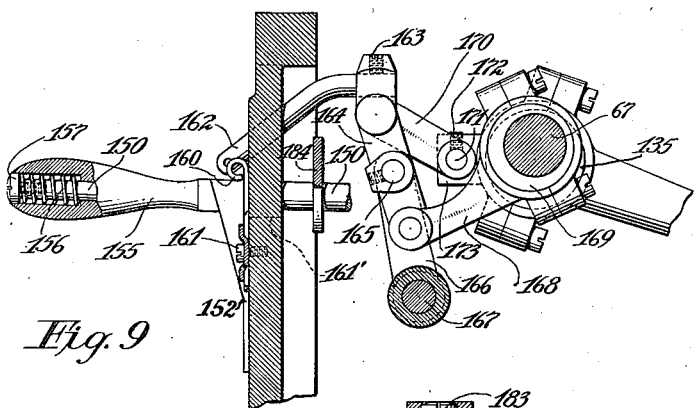
Fig. 9
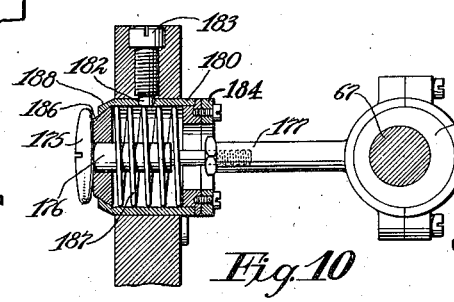
Fig. 10
Fig. 11
WITNESS:
Robert F. Beck
INVENTOR
Rudolph Becker,
BY
Henry J. Miller
ATTORNEY

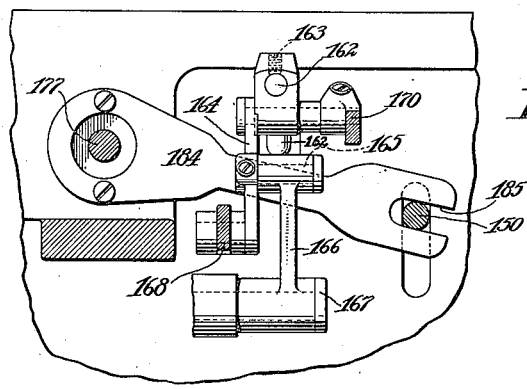
Fig. 12
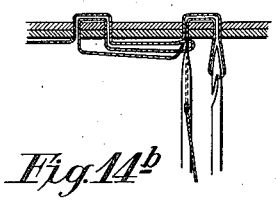
Fig. 14ᵇ
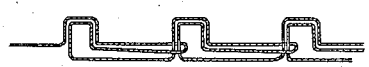
Fig. 13
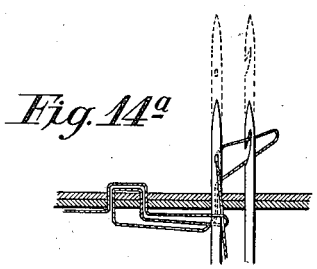
Fig. 14ᵃ
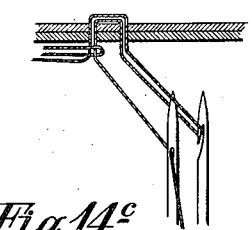
Fig. 14ᶜ
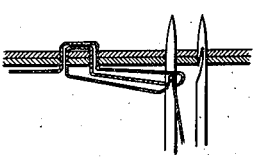
Fig. 14ᵈ
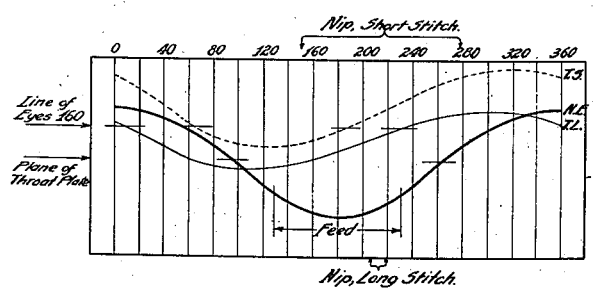
Fig. 14
INVENTOR
Rudolph Becker
BY
Henry J. Miller
ATTORNEY

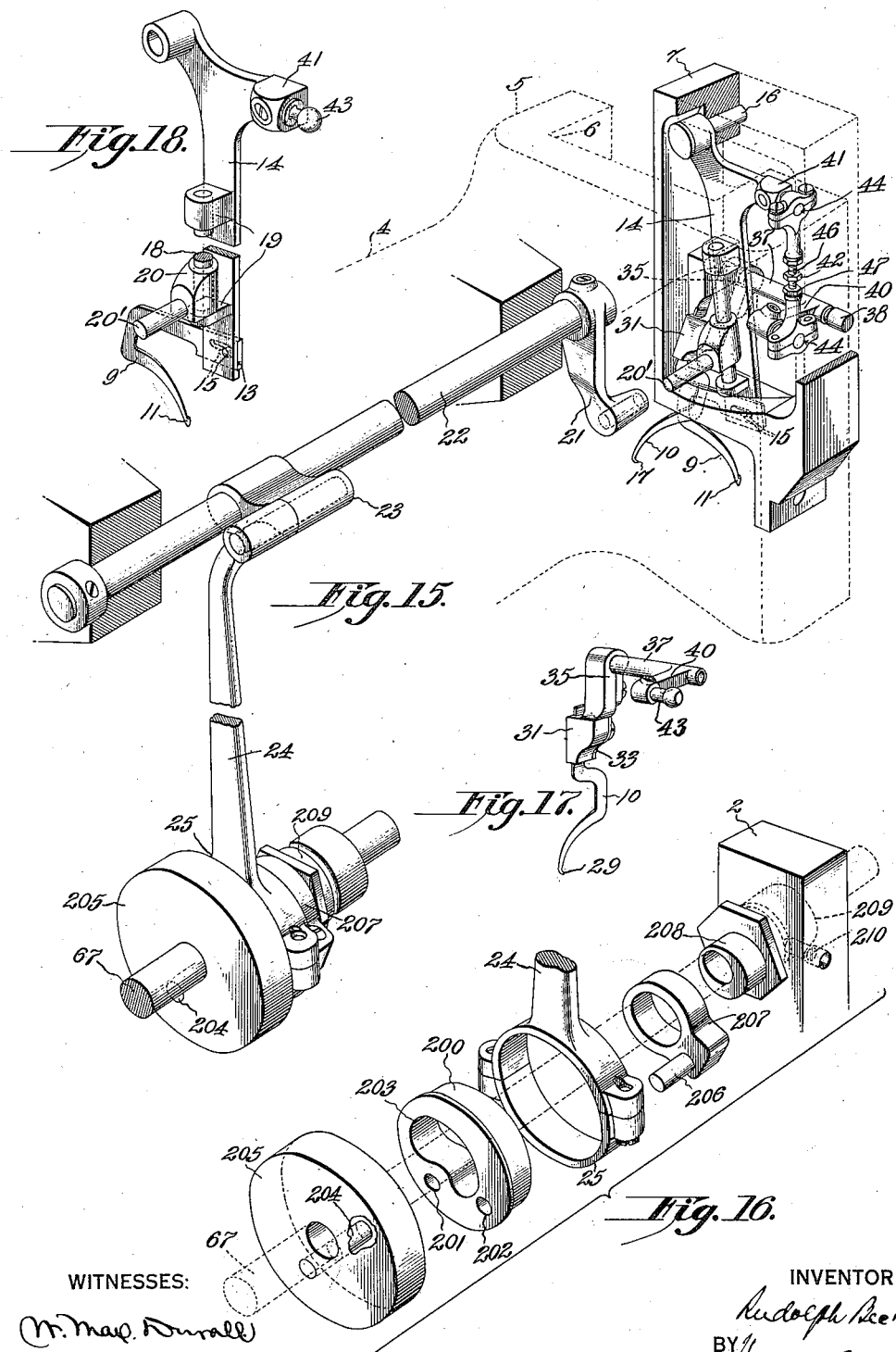

Patented Sept. 19, 1922.

1,429,399

UNITED STATES PATENT OFFICE.

RUDOLPH BECKER, OF ROSELLE PARK, NEW JERSEY, ASSIGNOR TO THE SINGER MANUFACTURING COMPANY, A CORPORATION OF NEW JERSEY.

STRAW-BRAID SEWING MACHINE.

Continuation of application Serial No. 200,273, filed November 5, 1917. This application filed February 1, 1919. Serial No. 274,520½.

*To all whom it may concern:*

Be it known that I, RUDOLPH BECKER, a citizen of the United States, residing at Roselle Park, in the county of Union and State of New Jersey, have invented certain new and useful Improvements in Straw-Braid Sewing Machines, of which the following is a specification, reference being had therein to the accompanying drawings.

This invention relates to machines of the character shown and described in the United States patent to Willcox & Noble, No. 392,087, October 30, 1888, Willcox & Noble, No. 412,218, October 1, 1889, Wiseman, No. 565,585, August 11, 1896 and Wiseman No. 1,137,249, April 27, 1915, for sewing straw braid by means of stitches resembling those made by hand, in that on the right side of the work they appear as distinct spaced loops. In machines of the character represented by the above mentioned patents needles or work piercing elements are attached to a reciprocatory carrier below the work-plate, are thrust up through the work and cooperate with certain looping devices which are carried by the presser-foot above the work-plate. Since these looping devices are raised and lowered with the presser-foot, whose position in operation depends upon the thickness of the work beneath, it has been found desirable to vary the upper limit of the stroke of the needles in order uniformly to present the needle-loop in the best position to be caught by the looper. The necessary variation in the needle-stroke is effected by a controller mechanism, which is connected with the presser-foot and a part of the needle-operating mechanism, so as to be automatically set or adjusted thereby.

This controller mechanism, in the machines of the prior art, is so organized that displacement of a part (a slide block) of the needle-bar operating mechanism is resisted in one direction only by the pressure of the presser-foot spring and if the force tending to displace the said part is great enough it will be shifted from the advantageous position to which it has been automatically adjusted for the particular thickness of work under the presser-foot, thereby defeating the function of the controller mechanism. To insure against slippage or shifting of the said part (a slide block) of the needle operating mechanism after it has been automatically set or adjusted by the thickness of work beneath the presser-foot, the machines of the prior art were equipped with a clamp or lock of one form or another which have been found to be objectionable because they limit the speed of the machine and because their inevitable wear and failure results in the machine skipping stitches.

To supplement the above succinct explanation, a full exposition of the prior art mechanism for operating and controlling the needles will now be made.

The controlling mechanism of the prior art machines comprises essentially a linkage directly connecting the presser-foot with a slide block forming a part of the needle-bar operating mechanism. The needle-bar operating mechanism comprises this same slide block adjustable in a curved slot in an arm on a rock-shaft having a second arm non-adjustably linked to the needle-bar and a driving link actuated from an eccentric on the main-shaft and pinned at its lower end to the said slide block. The rock-shaft of this needle-bar operating mechanism is turned through a greater or less angle according to the distance of the slide block from its axis, the nearer the block to the axis of the rock-shaft the greater the lift of the needles above the throat-plate. The organization is such that when the work under the presser-foot increases in thickness the controlling mechanism will automatically shift the slide block in the curved slot toward the axis of the rock-shaft and extend the upper limit of the needle-stroke so that the needle will maintain the same definite cooperative relation with the loopers carried by the presser-foot despite the increase in thickness of the work, and vice versa.

In the organization of the patents mentioned the center of curvature of the curved slot in the arm of the rock-shaft which receives the slide-block coincides with the pivotal axis of the upper end of the driving link at that time in a stitch-forming cycle when the needles are about to enter the work. In this position conveniently described as its neutral position, the slide-block may be shifted without moving the needles.

From a consideration of the patented constructions, as they are at present understood, it appears that the presence of a clamp or lock is necessitated by the timing of the slotted arm to arrive at its neutral position when the needles first strike the goods and when in consequence the greatest load is imposed upon the needle-operating mechanism. At this time the presser-foot spring alone appears to restrain the tendency of the two needles to lift the goods from the work-support and the strength of this presser-spring is limited and determined by the requirements of the feed. If a blow delivered by the needles in entering the goods be stronger than the force of the presser-foot spring, the slide-block will be displaced toward the fulcrum of the slotted arm. The displacement would apparently continue while the needles go on up until a component of the power transmitted by the driving link is equal to or greater than the oppositely directed pull from the presser-foot, transmitted to the block through the controller mechanism. But by the time this component builds up sufficiently to hold the slide-block the needle-operating mechanism would apparently be adjusted for a greater thickness of work than is under the presser-foot and hence the needles would go farther above the loopers than would be desirable for the perfect formation of stitches. Therefore the mechanisms of the prior art were supplied with a clamp or locking device to hold the slide-block when the needles passed upwardly through the work.

But whatever may be the explanation for the presence of the clamp or locking device in the controlling mechanisms of the prior art, it is an indisputable fact that a clamp or locking device has heretofore been necessary to the attainment of an end which by this invention is realized without a clamp or locking expedient.

It is an object of this invention to simplify the control for the needle-operating mechanism which varies the throw of the needles for different thicknesses of work by eliminating a clamp or locking device heretofore found to be necessary to insure maintenance of substantially the same cooperative relation between the work-piercing and loop-handling devices for various thicknesses of work.

In the present invention the needle-operating mechanism is so organized and the controller mechanism connected therewith is so arranged that displacement of a part (a slide block) of the needle-bar operating mechanism is resisted by the tendency of the presser-foot to clamp more firmly down upon the underlying work when the needles penetrate the material. In this way the needles are positively prevented from getting out of advantageous cooperative relation with the loopers without a clamp or lock in the organization of the controller mechanism.

The present invention also aims to provide a looper-actuating mechanism for sewing machines which will enable the machine to stitch reliably at a higher rate of speed than is possible with mechanism heretofore in use, and which is both durable and mechanically efficient in service, thus obviating repairs and excessive consumption of power in the operation of the machine.

It is another object of this invention to simplify the relative arrangement of the loopers and their driving mechanism from the main-shaft by compactly supporting them on a slidable member and by actuating them through a single crank-arm on a rock-shaft sustained by the overhanging arm of the machine.

It is a further object of this invention to improve the feeding mechanism for this class of machines by simplifying its drive from the main or power shaft and by facilitating its ease of regulation.

It is a still further object of this invention to better the control of the thread in this type of machine in order to set different lengths of stitches properly and without special adjustment of the thread-controlling mechanism.

Another object of this invention is to make it easy for the operative to start the centers or "buttons" of a hat crown by providing simple means for relieving the presser-foot of the pressure of its spring.

And the all inclusive object of this invention is to organize the mechanical parts for obtaining the ends previously enumerated in a machine capable of being operated at a high speed.

The stitch-forming mechanism consists of needles mounted below the work-support on a vertical reciprocatory slide-bar which is actuated from a slotted rocker positively driven by an eccentric strap about an eccentric on the main-shaft. A link connects the slide-bar with a block carried by the slotted rocker and this link is of a length equal to the radius of curvature of the slot in the rocker. The lower limit of the needle-stroke is substantially fixed, but its upper limit is varied according to the thickness of the work by a chain of links and levers connecting the presser-foot to the slide-block. When the work passing under the presser-foot increases in thickness the train of mechanism mentioned moves the slide-block outwardly in the slot of the rocker and, as the latter's angular displacement is constant, increases the upper limit of the needle's stroke. It is preferable that the lower limit of the needle's stroke be substantially fixed and invariable and this operation is obtained by having the center of curvature of the curved slot arranged to coincide with the upper end of the link connection to the needle slide-bar when and only when the rocker is in its lowest position.

The loopers are sustained in a slidable frame which is supported by the presser-foot connected directly thereto. In operation consequently the loopers move in paths which are a constant distance above the plane of the upper surface of the work. Two loopers are employed and they are linked together for operation in unison and in intersecting planes parallel, or nearly so, with the paths of the needles. The loopers are both actuated from a compound eccentric which imparts a variable motion to the loopers, which dwell when the needles are down and retard and accelerate rapidly at one end of their stroke when the needles are up. The mechanism is such that in effecting a reversal of the direction of movement of the loopers their retardations and accelerations are relatively abrupt, more so than with the mechanisms of the prior art, and without excessive travel of the loopers past the needles during the transfer of the thread from the eyed- to the hooked-needle.

The feeding mechanism includes a comparatively long lifting link whose lower pivotal support is located a substantial distance below the feed-dog and whose upper pivotal connection with the feed-dog supporting member is located close to the feed-dog itself and very nearly in line with the load put upon it in advancing the goods. The horizontal throw of the feeding mechanism is varied to change the length of stitch by a regulator preferably in the form of a lever pivoted on the main-shaft.

To vary the action of the take-up and nipper which together constitute the thread-controlling mechanism proper, and to supplement the eye-pointed needle in setting the stitch, connections are provided between the regulator and nipper and between the regulator and an element whose position is governed by the regulator for altering the take-up's throw and the nipper's grip when the stitch length is varied. Manifestly this is desirable as it frees the operator's attention for concentration on the work.

Figure 2:
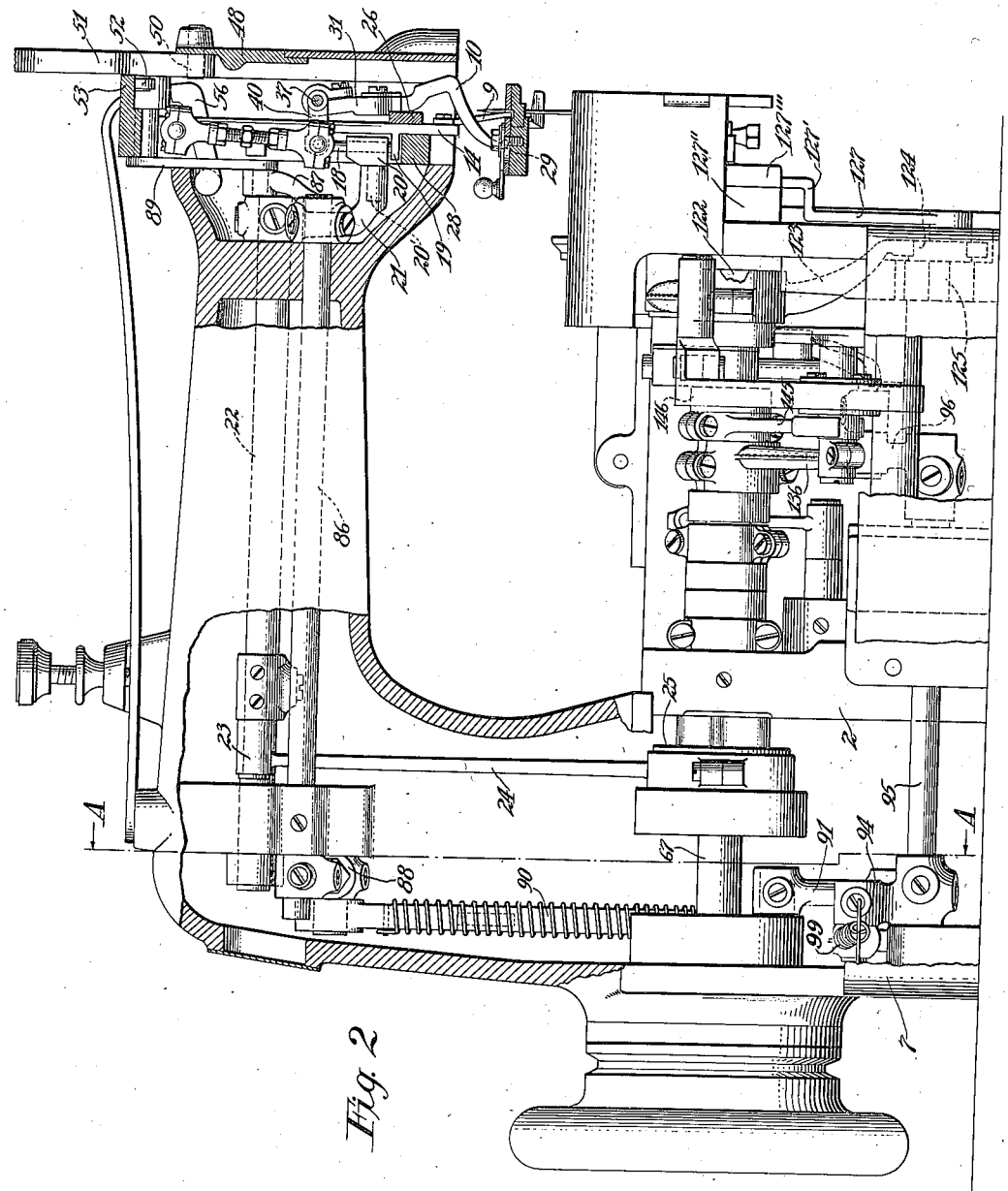
Figure 3:
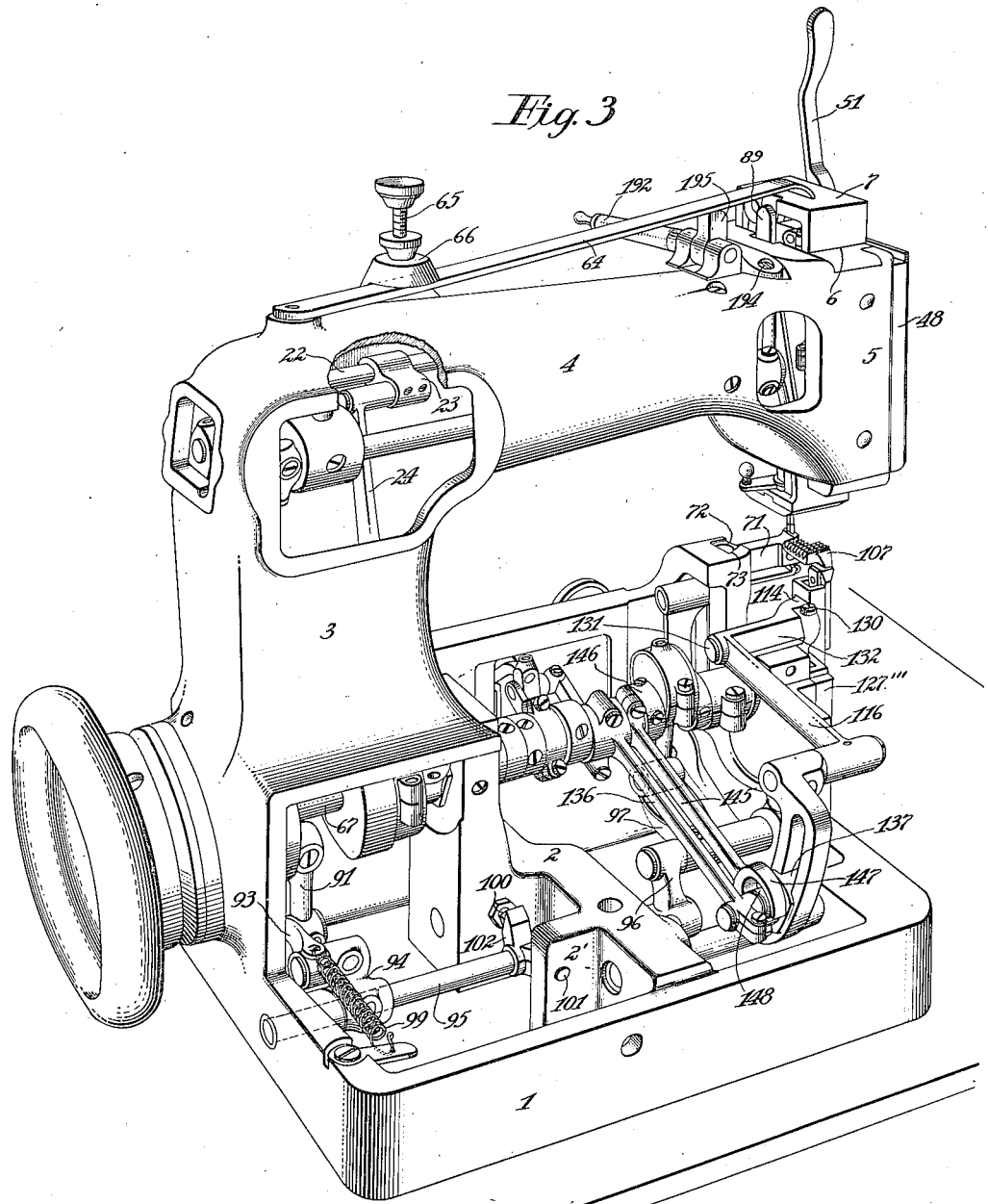
Figure 4:
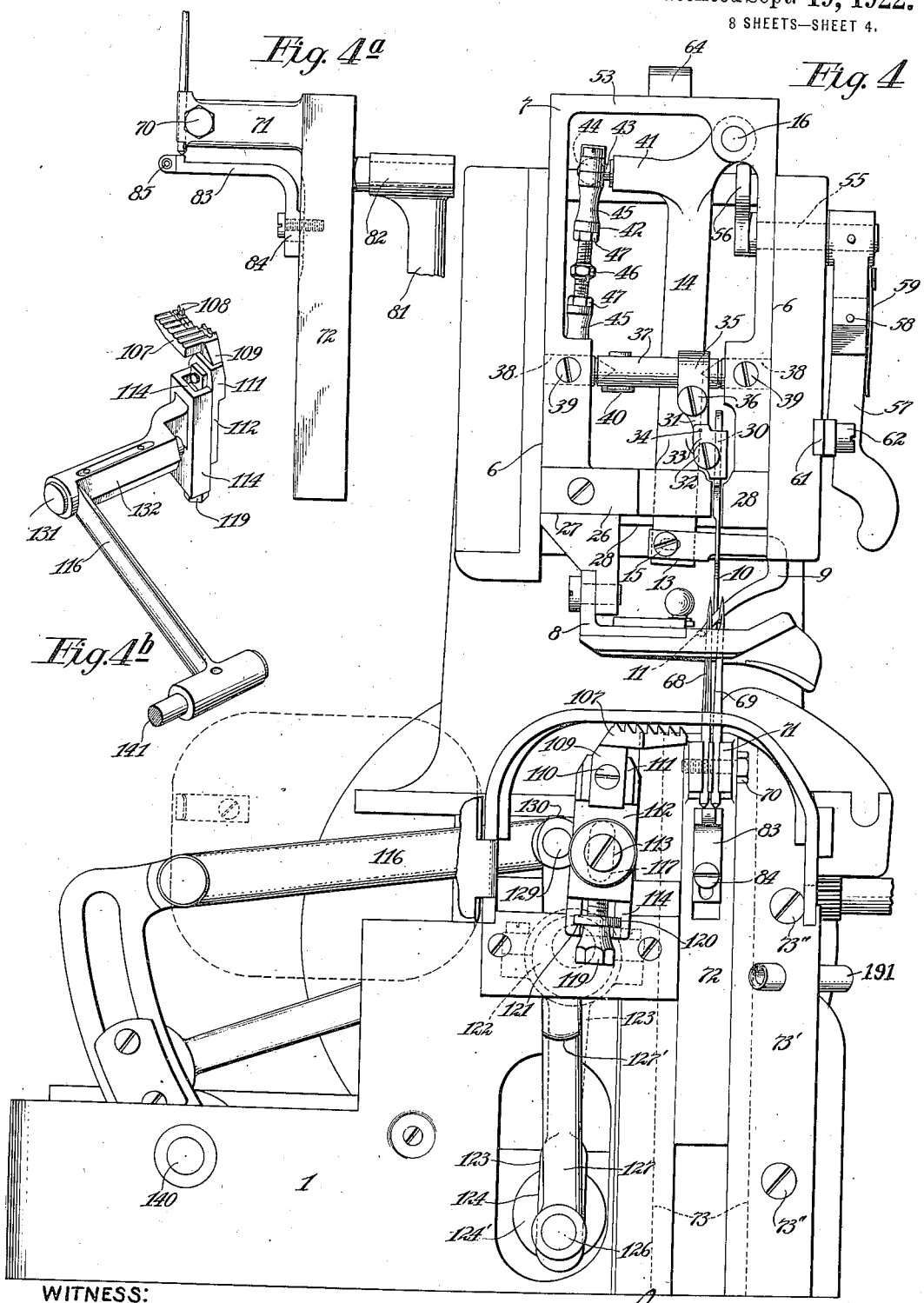
Figure 5:
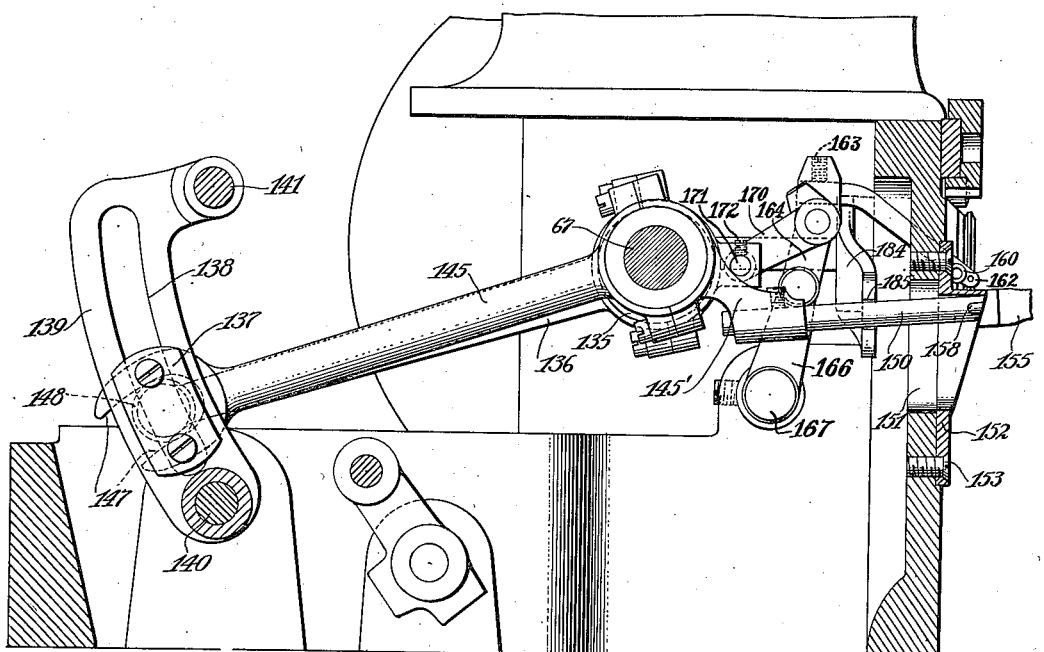
Figure 6:
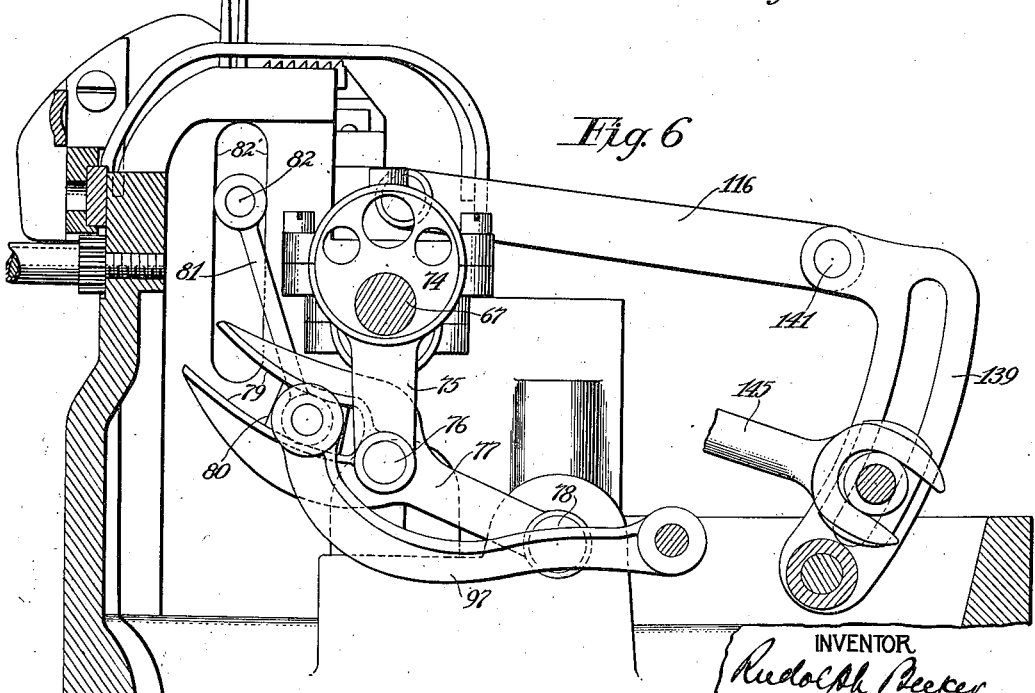

In the accompanying drawings the invention is illustrated in its preferred form. Fig. 1 is a front side elevation of the machine. Fig. 2 is a rear side elevation of the machine with a removable section of the base-portion of the frame omitted and with part of the over-hanging arm sectioned to expose the mechanism. Fig. 3 is a perspective looking down upon the machine from its rear end and rear side. Fig. 4 is an end elevation of the machine with a section or plate of the head removed to expose a slide frame carrying the presser-foot and supporting the loopers and their operating mechanism. Fig. 4$^a$ is a detail in front side elevation of the needle slide bar. Fig. 4$^b$ is a perspective of the feed-dog and its supporting member or link. Fig. 5 is a cross-section of the mechanism beneath the work-plate immediately to the left of the feed regulating lever and looking toward the right hand end of the machine. Fig. 6 is a cross-section similar to Fig. 5 looking toward the left hand end of the machine. Fig. 7 is an elevation of the slide frame supporting the presser-foot looking at the side opposite to that viewed in Fig. 4. Fig. 8 is a cross-section on the line A—A, Fig. 2 showing part of the "controller" mechanism. Fig. 9 is a cross-section through the front wall of the base-portion of the frame between the nipper and the take-up disclosing the latter in side elevation. Fig. 10 is a detail in vertical cross-section through the nipper. Fig. 11 is a plan view of a barrel portion of the nipper. Fig. 12 is a rear side elevation of a portion of the front wall of the frame showing the nipper and take-up as they appear from that side. Fig. 13 is a diagrammatic illustration of the stitch made by this machine. Fig. 14 is a diagram representing the relative motion of the eyes of the needle and take-up on both a long and a short stitch. Figs. 14$^a$, 14$^b$, 14$^c$ and 14$^d$ represent successive stages in the formation of the stitch. Fig. 15 shows the loopers and their actuating mechanism in perspective. Fig. 16 is a perspective of the compound eccentric mechanism for actuating the loopers with its parts in spaced relation. Figs. 17 and 18 are perspective views of the two loopers.

The frame of the machine consists of side and end walls defining a base-portion 1, Fig. 3, crossed centrally by a web 2, and of a vertical standard 3 from which extends laterally an overhanging arm 4 carrying the usual head 5.

A vertically extending U-shaped guide-way 6, Fig. 4, is formed in the head and receives a slide-frame 7 having parallel sides arranged to slide therein. Suitably secured to the lower end of the slide-frame is a presser-foot 8 of any old and well known construction adapted to sew straw braid. The loopers of the stitch-forming mechanism are carried by and housed within the slide-frame carrying the presser-foot. For convenience in description these loopers may be termed a looper 9 and a threader 10, the former taking the loop from the needle and the latter deflecting one limb of the loop so as to be caught by the barb of the hooked needle. The looper 9 is provided with a hook 11 for catching the loop thrown out by the needle and its substantially U-shaped body-portion lies in a plane parallel with the line of feed. The looper is adjustably secured in a groove 13 in the end of a bell-crank-lever 14 by a screw and slot connection 15 and is swung about the fulcrum 16 of the lever at the upper end of the slide-frame 7 through a series of connections with the main driving shaft of the machine comprising a pin 18, Figs. 7 and 18, fixed in any suitable manner in ears 19 on the rear of the lever 14 and embraced by a collar 20 having a pin 20' loosely inserted in the depending bent end of a crank-arm 21, Figs. 2 and 15, fast on the rock-shaft 22 which is journaled in the overhanging arm and has a second crank-arm 23 at its opposite end connected by a pitman 24 to a compound eccentric, indicated generally by the numeral 25, on the main-shaft of the machine. This compound eccentric is clearly shown in Fig. 16 and will be described in detail later. The lower end of the lever 14 carrying the looper 9 is steadied against sidewise displacement so as to vibrate in a plane by means of a horizontal bar 26, Figs. 2 and 4, screwed fast in a seat 27 in the slide-frame with its inner face in parallelism with the lower wall 28 of a slide-frame.

The other looper or threader 10 has its body-portion arranged in a plane intersecting the first-mentioned looper at right angles and transverse to the vertical plane of feed. The threader is formed with a very small beak 29, Figs. 2 and 17 at its lower end for engaging one limb of the needle-loop after it has been drawn out by the looper. The threader is clamped at its upper end in a narrow channel or seat 30, Fig. 4 in a crank-arm 31 by means of the clamping screw 32 and plate 33 which is steadied by a pin 34 carried by the arm and fitting in a hole in the plate. The crank-arm 31 has a split hub 35 Figs. 4, 15 and 17 clamped by a screw 36 about the fulcrum shaft 37 which is preferably countersunk at its ends as shown to receive the pivot bearing pins 38 adjustably secured in the slide-frame by means of the screws 39. A second crank-arm 40, Figs. 2, 15 and 17 is fixed on the fulcrum-shaft 37 at substantially right angles to the first mentioned crank-arm 31. The fulcrum-shaft 37 of the threader is arranged transversely of the fulcrum 16 of the lever 14 supporting the looper 9 and is spaced a considerable distance below the same. A short arm 41 of the looper supporting lever 14 is linked as indicated generally by the numeral 42 to the crank-arm 40 of the lever supporting the threader. As these arms 40—41 vibrate in planes intersecting each other at substantially right angles, their connections with the link are made universal. Ball ended pins 43 are carried by the arms and sockets 44 are provided in the end sections 45 of the link and are adjustably connected by an oppositely threaded screw 46 equipped with lock-nuts 47. This adjustable connection permits of nice timing and clearance of the loopers.

By supporting the loopers in the compact manner shown and described and by operating both loopers from a single crank-arm 21 on a rock-shaft through a connection which permits of elevation of the presser-foot without substantial alteration of the cooperative action of the loopers the looper operating mechanisms of the prior art have been very much improved upon.

For convenience in manufacture the face of the head is formed in the shape of a removable plate 48, Fig. 2, secured in place by screws tapped into the head. On the inner side and at the upper edge of the plate 48 a pin 50 is secured and affords a fulcrum for a presser-foot lifting lever 51 having a friction roller 52 which is designed to extend within and below the upper wall 53 of the slide-frame so that on lifting the lever the presser-foot may be raised with the slide-frame.

A second presser-foot lifting lever is provided to enable the operator, while stitching, to turn corners conveniently. Fulcrumed on a pin 55, Fig. 4 arranged in the upper part of the head on the overhanging arm is a finger or arm 56 which extends under a fixed part of the presser-foot supporting member 7 as shown. A finger-piece 57 constituting a second arm on the fulcrum-pin is made in two parts hinged together as shown at 58, the lower of which parts is pressed by a spring 59 carried by the other part into a notch between the teeth 60, Fig. 1 spaced a suitable distance apart on a plate 61 which is removably secured by a screw 62 in a seat 63 also on the front of the head of the machine. A flat presser-foot spring 64 of bar-like form is fixedly supported above the overhanging arm at one end adjacent the vertical standard and its opposite free end rests upon the the top wall of the slide-frame. For varying the pressure of this spring a thumb-screw 65 is tapped into a lug 66 overhanging the flat spring in a manner well known.

Beneath the work-support in bearings in the end-walls and in the central web of the frame is journaled the main-shaft 67 of the machine, its axis being substantially parallel to the overhanging arm.

The work-piercing elements, in the form of an eye-pointed needle 68, Fig. 4 and a hooked needle 69 are clamped by a screw 70 in the split end of an arm 71, shown best in Fig. 4ª, extending laterally from a vertically reciprocating slide-bar 72, Fig. 4, having relatively inclined sides fitted in a dove-tail guide-way 73 formed in the end of the base 1 with a side-wall 73' removably secured by screws 73''. The needles are actuated from an eccentric 74, Fig. 6, on the main-shaft embraced by the strapped end of a pitman 75 whose opposite end is pinned as shown at 76 to an actuating rocker 77 fulcrumed on a horizontally fixed pin 78 supported in the frame and provided with a substantially curved slot 79 in which is fitted a slide-block 80 pinned to the lower end of a link 81 whose upper end is pinned at 82 to the rear of the needle slide-bar through a slot 82' in the frame. An angle or bracket 83, Fig. 4ª is adjustably secured to the needle slide-bar by the screw-and-slot connection shown at 84 with its horizontal portion below the ends of the needles adjacent which it is pierced to form a thread-guide-eye 85. During the rotation of the main-shaft the actuating rocker 77, Fig. 6, is vibrated and through the slide-block, link and needle slide-bar the needles are reciprocated up and down a distance depending upon the position of the slide-block in the curved slot. Preferably the curvature and location of the curved slot in the rocker is such that when the rocker is in its lowest position the center of curvature coincides with the axis of the pin 82 at the upper end of the link 81 actuating the needle slide-bar. By this arrangement the lower limit of the stroke of the needles is fixed and variations in the extent of the needle stroke occur only at the upper end thereof.

In order to maintain the definite cooperative relation between the needles and the loopers, which is desirable to insure the correct formation of stitches, the needles should always reach a point substantially the same distance above the active end portions of the loopers for all thicknesses of work, it being remembered that the loopers are shifted bodily up and down with the presser-foot. This result is accomplished by a linkage directly connecting the presser-foot and the slide-block to the actuating rocker which will now be described. A rock-shaft 86, Figs. 2 and 8, supported in the overhanging arm is provided at its opposite ends with crank-arms 87—88 the forward one 87 of which is linked to the presser-bar as shown at 89 and the rearward adjustable one 88 of which is linked, as shown at 90, to a bell-crank 91 pivoted at 92 beneath the main-shaft of the machine and linked, as at 93, to the rear crank-arm 94 on a controller rock-shaft 95 which carries at its forward end a second arm 96, Fig. 3, connected by a curved link 97, Fig. 6, to the slide-block 80 on the side opposite the link 81 running to the needle slide-bar. It will thus be seen that when the presser-foot is lifted, through the links and levers above described, the slide-block will be moved away from the fulcrum 78 of the actuating rocker 77 and the stroke of the needles increased. On the other hand when the presser-foot is lowered the slide-block will be moved toward the fulcrum 78 of the rocker 77 and the stroke of the needles decreased. Preferably, but not necessarily, a light tension spring 99, Fig. 3, is applied to the rear crank-arm of the rock-shaft tending to assist the presser-foot spring in moving the slide-block toward the fulcrum of the slotted rocker.

The movement of the slide-block in the curved slot 79 of the rocker is limited in either direction by the adjustable stop-screws 100—101, Fig. 3, tapped into the central web 2 and a lug 2' projecting therefrom on opposite sides of a vertical plane containing the controller rock-shaft 95. These stop-screws 100—101 are adapted to be struck by an arm 102 clamped to the controller rock-shaft. In order to permit of elevation of the presser-foot a further distance than that determined by the stop-screw 100, the link 90 is preferably, as shown, made in sections 103—104 yieldingly connected together by a strong spring 105, which is under tension, and by a pin-and-socket connection indicated at 106 maintaining the sections in alinement. The tension-spring 105 is made strong enough to prevent the sections of the link 90 from separating on lifting the presser-foot so that it will act substantially as a solid link in the functionating controller mechanism. Obviously, however, if it is not desirable or necessary to provide the presser-foot with an extra lift independent of the controller mechanism, the link 90 may be made solid.

It will thus be seen that the needle-operating mechanism is automatically adjusted or controlled by the thickness of the work beneath the presser-foot through mechanism constituting a practically positive train of connections between the slide-block 80, which is a part of the needle-operating mechanism, and the presser-foot, which is carried by the slide-frame 7. Special emphasis is laid on the fact that the presser-foot solely is relied upon to effect an adjustment of the slide-block and to maintain or hold an adjustment, once it has been made, without a clamp or locking device to insure against slippage. It will also be apparent that the slide-block cannot slip when the needles are penetrating the work because movement of said slide-block toward the axis of the rocker 77 is resisted by the work underneath the presser-foot. In other words the tendency of the block to slip when the needles enter the work is resisted by the clamping of the presser-foot more firmly down upon the work. Or in other words still, the tendency of the block to slip results in the controller mechanism moving or tending to move the presser-foot in the same direction as it is urged by the presser-foot spring. It will also be noted that the loopers are positively actuated from a single crank-arm on a rock-shaft, one looper transmitting motion to the other. And in both the needle and looper operating mechanisms there is nothing mechanically opposing the attainment of a high speed.

The feed-dog 107, Fig. 4ᵇ, is shaped like a rectangle in plan view, its front corner being cut out to receive the needles. Its serrated upper face is gouged out in the line of seam-formation directly in rear of the needles and it is equipped with a pair of prongs 108 at the front to insure the advance of the material step-by-step. A depending post 109, Figs. 4 and 4$^b$, integral with the dog is fixed by a screw 110 between the flanges 111 of a block 112 which is clamped by a screw 113 in the channeled head 114 of a feed-dog supporting member in the form of a link 116 with an enlarged and offset portion at one end constituting the head 114 shown best in Fig. 4$^b$. To permit adjustment of the feed-dog relative to the channeled head 114, Fig. 4 the block 112 is slotted as indicated at 117 to receive the clamping-screw 113. For conveniently effecting the adjustment a turn-screw 119 is tapped into the block and it has a restraining collar 120 rotatable between the sides of a milled cut 121 in the slotted head.

The feed-dog is given the usual feeding and lifting movements from a pair of spaced eccentrics on the main-shaft and operates through slots in a throat-plate having a hook behind the tandem needles for guiding the loops of thread as they move forward with the material as is well known to those skilled in the art.

For lifting the feed-dog the eccentric 122, Fig. 4, is embraced by a pitman 123 extending downwardly and laterally a relatively considerable distance, in the present instance about 2$\frac{3}{4}$ inches, in between the sides of a groove 124 in the disk-like head 124' of a swivel-pin 125 (Fig. 2 only) mounted in the frame where the pitman is provided with a pivotal connection 126 to an upwardly extending link 127 bent intermediate its ends as shown at 127' Fig. 2 in a direction away from the pitman 123 and extending upwardly to its point of pivotal connection with the feed-dog supporting member. The pivotal connection between the link and the feed-dog supporting member is in the form of a relatively long pin 129, Fig. 4 set-screwed as indicated at 130 fast to the link 127 and having a head 131, Figs. 3 and 4$^b$, at its opposite end restraining endwise movement of the boss 132 of the feed-dog supporting member 116 embracing the pin 129. The upper end of the link 127 above the bend 127' is steadied between a vertical face of the lug 127'' integral with the frame and a U-shaped plate 127''' screwed thereto as shown. The feed-dog is given its vertical components of motion or lifting movements through these connections.

For imparting feeding movements to the dog the eccentric 135, Fig. 5 on the main-shaft is embraced by a pitman 136 extending rearwardly a relatively considerable distance, in the present instance about 4 inches, where a block 137 is pivoted so as to slide in an arcuate-slot 138 in a feed rocker 139 pivoted at its lower end to the frame of the machine as shown at 140. At the upper end of the rocker the feed-dog supporting member or link 116, Fig. 6 is pivoted on the pin 141. The before mentioned boss 132 extends laterally from the body of the link into proximity with the feed-dog where the channeled head 114, adjustably supporting the feed-dog, is located. Through these connections the feed-dog is given its horizontal components of motion or feeding movements which, it is to be observed, are substantially flat because of the relative great length of the vertically arranged link 127 carrying the pin 129 or movable fulcrum of the feed-dog supporting member. The link 127, feed-dog supporting member 116 and feed-rocker 139 constitute an approximately parallel linkage of which the frame of the machine is the fixed link.

A feed regulator is provided for varying the length of stitch, such variation occurring at the rear end of the feed-stroke because the feed-dog always rises and engages the work at the same point relative to the paths of the needles. The feed regulator is in the form of a lever 145, Fig. 5 pivoted on the the main-shaft 67 between a collar 146, Fig. 3 and the feed-eccentric 135 and having a fork 147 curved as shown at the end of its long arm embracing a friction roll 148 carried by the block 137 in the slotted feed-rocker 139 so that the operator is enabled on manipulating the opposite end of the lever to shift the block to and from the fulcrum of the feed-rocker to vary the length of feed or stitch. Convenient control of the feed regulator is provided by extending a pin 150, Fig. 5, secured in the short arm 145' of the lever through a slot 151 in the front wall of the frame in register with which slot is a correspondingly shaped opening in a segment plate 152 secured by screws 153, Fig. 1, to the frame and provided on opposite sides of the elongated opening with a series of sockets 154. A handle 155, Fig. 9, is sleeved on the end of the pin 150 and a coiled spring 156 is interposed between the bottom of a socket in the handle and the head of a screw 157 threaded into the pin 150. A pair of diametrically disposed pins 158, Fig. 5, are arranged on the inner end of the handle 155 and are adapted to seat in the sockets 154 in the plate. These sockets and pins may be of such size, shape and spacing as to permit of any desired variations in the length of stitch.

The thread controlling mechanism comprises a take-up and a nipper located on the front wall of the frame convenient to the operative.

Thread guiding eyes 160 are adjustably secured as indicated at 161 or in any suitable manner on the front wall of the machine in line with a slot 161' in the frame so that the apertured free end 162 of the take-up may vibrate between the eyes. The eyed-arm 162 of the take-up is clamped by a set-screw 163 in one end of a lever 164, Figs. 9 and 12, which is fulcrumed intermediate its ends as shown at 165 to a rock-arm 166 which in turn is fulcrumed on the pin 167 fixed horizontally in the central web below and in front of the main-shaft of the machine. The lever 164 and the eye-ended arm 162 together constitute the take-up proper and move as one. For actuating the take-up a pitman 168 connects the lower end of the lever 164 with an eccentric 169 on the main-shaft while a link 170 connects its upper end with a pin 171 secured by a set-screw 172 in a lug 173 integral with the eccentric-strap embracing the feed eccentric 135. When the feed is regulated the action of the take-up is varied simultaneously with that of the nipper by reason of the angular rotation of one end of the link connection 170 about the center of the feed actuating eccentric.

The nipper, see Figs. 10 and 11, comprises a clamping head or button 175, whose stem 176 is threaded into the end of a pitman 177 strapped about an eccentric 178 on the main-shaft, and an adjustable abutment which embraces the stem. This abutment consists of a cylindrical barrel 180 in whose outer wall is an inclined slot 181 receiving the stud-end 182 of a screw 183 tapped into the frame. An arm 184, Fig. 5, fixed to the rear end of this barrel has a forked extremity 185 embracing the pin 150 in the manipulating end of the feed regulator. When the feed is changed the barrel is turned by means of this arm forked about the feed regulator and the inclination of the slot in the barrel is such that nipping of the thread is timed to occur later when the stitch is long than when it is short and vice versa. So that the thread will not be crushed and in order to allow the meeting faces of the abutment and clamping head to meet squarely, a washer 186, Fig. 10, is loosely mounted in the barrel. A spring 187 of the proper strength resting on the rear end of the barrel, thrusts the washer toward the clamping head or button and against the inturned restraining flange 188 at the front end of the barrel.

A constant tension device 189 of any suitable form is secured on the front wall of the vertical standard and thread from any suitable source is passed through this tension device through thread-eyes 190—190' on opposite sides of the nipper, through the thread-eyes 160, and the eye of the take-up to a tube 191 set at an inclination in a horizontal plane in the frame with its delivery end adjacent the path in which the needles reciprocate. The thread is then passed through the eye 85 in the end of the angular abutment or bracket 83 up along the groove in the needle 68 and through its eye.

The compound eccentric mechanism for actuating the loopers, which mechanism is indicated generally by the numeral 25 and is best illustrated in Fig. 16, includes an eccentric disk 200 embraced by the strap-end of the pitman 24. The eccentric disk 200 is apertured at 201 and 202 and slotted as indicated at 203 to permit it to be pivoted on a pin 204 fixedly secured in a disk 205 fastened to the main-shaft 67. The aperture 202 and slot 203 permit the eccentric disk 200 to be oscillated while rotating by a second pin 206 on a link 207 which is pivoted on a stationary eccentric portion 208 of a bushing 209 adjustably secured by a set-screw 210 within a fixed part, web 2, of the frame of the machine. The main-shaft 67 passes through the various components of the eccentric mechanism in the manner indicated in Fig. 16, the disk 205 alone being fast to the main-shaft.

In operation the pin 204 compels the eccentric disk 200 to rotate or turn with the main shaft while the link 207, which is being dragged around the stationary eccentric, compels the eccentric disk 200 to swing about its pivotal connection 201—204 and thereby to vary its eccentricity during each cycle of operations. By suitably disposing the slot 203 in the eccentric 200 the arc in which the eccentric moves may be made to intersect the axis of the shaft 67 and thereby its center may be brought into coincidence with that of the main-shaft. Thus a dwell may be produced in the movement of the loopers during the operation of the machine and in this movement of the loopers link 207, functions as a toggle. Obviously if the center of the eccentric 200 is shifted across the axis of the shaft 67 the loopers may be made to reciprocate twice during each complete rotation of the main-shaft. The adjustment permitted by the screw 210 enables the loopers to be timed as desired.

While the compound eccentric mechanism described immediately above is preferentially employed in a straw-braid machine of the type described in this application, it is to be distinctly understood that the same is only illustrative of the principle of this feature of the construction as the dwell characteristic thereof is obviously valuable for the actuation of one or more loopers in their cooperative movement with one or more needles in any species of sewing machine.

The operation of the thread-controlling mechanism will now be described.

When the needles enter and pass up through the work they draw upon the previously formed loop which has been shed by the hook and left encircling the shank of the eye-pointed needle. In the case of a long stitch the previously formed loop is already tight or nearly so and thread is consequently drawn by the eye-pointed needle from the supply, the nipper of course being open to permit such drawing action. In the case of a short stitch the previously formed loop is not snug about the shank of the eye-pointed needle and the latter passes some distance above the work before the previously formed loop is tightened about the shank of the needle, after which the needle in its continued rise above the work draws thread from the supply which is now free because the nipper releases its grip upon the thread about the time or a little after the needle-eye reaches the upper surface of the work.

The eye-pointed needle in its descent from its highest position to a position beneath the work supplies the same amount of thread for the stitch being formed whether it be long or short. In the case of a short stitch the needle supplies too much thread and in the case of a long stitch it does not supply enough thread. Thus the thread-controlling mechanism is called upon to perform a function in making a short stitch that is diametrically opposed to the function it must perform in making a long stitch. That is to say, in the case of a long stitch the thread-controlling mechanism must function mainly as a pull-off to meet a deficiency of thread and in the case of a short stitch mainly as a take-up to handle an excess of thread. Consequently while the needles are moving below the work and during the feeding action, thread is given up (when a long stitch is being made) by the arm 162 as it rises toward the line of the fixed eyes 160 and is taken up (when a short stitch is being made) by the arm 162 as it moves above and away from the line of the eyes 160. This will be clear from an examination of the curves shown in Fig. 14 without further explanation. These curves graphically express the thread-control throughout a stitch-forming cycle, and may be distinguished by the abbreviations N. E., T. L. and T. S., which respectively represent the movement of the needle-eye, the take-up on a long stitch and the take-up on a short stitch.

It is to be noted that the needle-eye curve N E, Fig. 14, was plotted from the machine with the presser-foot removed and consequently the maximum height of the needle-eye above the throat-plate therein shown is less than it would ever be in actual practice with the material under the presser-foot. It is to be noted also that vertical distances in Fig. 14 represent the actual travel of the needle-eye and take-up eye 162, while the diagrammatic views in Figs. 14ª—14ᵈ inclusive are double the actual size.

In Fig. 14 the duration of nip and of feed are also indicated.

It will be seen that the thread-controlling mechanism comprises a variable nipper and a variable take-up. The grip of the nipper varies from almost nothing on a long stitch to about a third of a revolution of the main-shaft on a short stitch. The throw of the take-up on a long stitch is a little less than its throw on a short stitch but its vibrations are largely below a line connecting the adjacent fixed eyelets 160 in the case of a long stitch whereas they are largely above the same in the case of a short stitch. By the simple arrangement for effecting this change in the movement of the take-up arm 162 together with the duration of the nipper's grip upon the thread, the action of the eyed arm 162 during a long stitch is substantially that of a pull-off and during the formation of a short stitch is substantially that of a take-up.

By making the variations in the stroke of the needle take place solely at the upper end of the stroke it will be seen that the eye-pointed needle will draw off more thread when the work increases in thickness than in the machines of the prior art in which variations in the needle's stroke occur at both ends of its stroke. Obviously increasing the drawing action of the eye-pointed needle when the work increases in thickness meets the demands of seam-formation better than the organizations in the prior art having the same type of controlled needle operating mechanism.

The wire from which the eyes 160 are bent or formed is preferably light enough to permit of a slight spreading or separation of the eyes when the strain put upon the thread running to the take-up is the greatest, as it is when a short stitch is being made and the take-up is in the position shown in Fig. 1.

Due to the adjustability of the eccentric 169 for the take-up, the eccentric 178 for the nipper, and the thread-eyes 160, the proper relative timing and the extent as well as the duration of action of these thread-controlling elements may be varied to suit the exact requirements of the stitch for various kinds of work. It is also to be noted that the eccentric (or crank equivalent) actuation of the take-up and of the nipper enables a machine of this type attaining a higher speed than those heretofore in use equipped with a cam driven take-up or nipper.

In sewing the "buttons" or centers of a hat crown it is the practice of some operatives to ease the pressure of the presser-foot spring upon the work by raising the presser-foot lifting lever. For the convenience of such operatives a machine, if desired, may be equipped with a release lever 192, Figs. 1 and 3, pivoted on the block 193 secured by screws 194 on the top of the overhanging arm 4 so that its short arm 195 may be swung up into contact with the presser-foot spring 64 to relieve the pressure of said spring upon the upper wall of the slide frame 7. Or with the presser-foot spring 64 rendered inactive the operative may stitch very thin and fragile braids and utilize the force of gravity to hold the presser-foot down upon the work.

It is also obvious that the invention is not confined to the described use of straw-braid sewing as it may be used for any purpose to which it is adapted, as for instance, basting purposes.

It is therefore to be distinctly understood that the invention is not limited to the specific construction shown and described, as the same is only illustrative of the principles of operation which are capable of extended application in various forms, and that the invention comprehends all construction within the scope of the accompanying claims.

Having thus set forth the nature of the invention, what I claim herein is—

1. In a sewing machine, in combination, a work-feeding member, a cooperating presser-foot having a work-engaging face, stitch-forming mechanism including thread-carrying and loop-handling devices operatively supported on opposite sides of the worn-engaging face of said presser-foot, the support for the loop-handling device being controlled by the presser-foot so as to move simultaneously therewith, mechanism for operating said thread-carrying and loop-handling devices, and means solely controlled by the presser-foot and connecting a part of the mechanism for operating said thread-carrying device with the presser-foot for establishing and maintaining substantially the same definite cooperative relation between the thread-carrying and loop-handling devices when the presser-foot shifts.

2. In a sewing machine, in combination, a work-feeding member, a cooperating presser-foot having a work-engaging face, stitch-forming mechanism including thread-carrying and loop-handling devices operatively supported on opposite sides of the work-engaging face of said presser-foot, the support for the loop-handling device being controlled by the presser-foot so as to move simultaneously therewith, mechanism for operating said thread-carrying and loop-handling devices, and positively acting means solely controlled by the presser-foot connecting a part of the mechanism for operating said thread-carrying device with the presser-foot for establishing and maintaining substantially the same definite co-operative relation between the thread-carrying and loop-handling devices when the presser-foot shifts.

3. In a sewing machine, in combination, a work-feeding member, a cooperating presser-foot having a work-engaging face, stitch-forming mechanism including thread-carrying and loop-handling devices operatively supported on opposite sides of the work-engaging face of said presser-foot, the support for the loop-handling device being controlled by the presser-foot so as to move simultaneously therewith, mechanism for operating said thread-carrying and loop-handling devices, and positively acting means solely controlled by the presser-foot connecting a part of the mechanism for operating said thread-carrying device with the presser-foot for establishing and maintaining substantially the same definite co-operative relation between the thread-carrying and loop-handling devices when the presser-foot shifts, said positively acting means including an extensible link permitting an extra lift of the presser-foot without effecting said part of the mechanism operating said thread carrying device.

4. In a sewing machine, in combination, a work-feeding member, a cooperating presser-foot having a work-engaging face, stitch-forming mechanism including thread-carrying and loop-handling devices operatively supported on opposite sides of the work-engaging face of said presser-foot, the support for the loop-handling device being controlled by the presser-foot so as to be moved thereby, mechanism for operating said thread-carrying and loop-handling devices, and means solely controlled by the presser-foot connecting a part of the mechanism operating said thread-carrying device with the presser-foot for establishing and maintaining substantially the same definite cooperative relation between the thread-carrying and loop-handling devices when the presser-foot shifts, said means including an actuating slotted rocker timed to arrive at a neutral position when the thread carrying device is at substantially the lower limit of its stroke.

5. In a sewing machine, in combination, a work-feeding member, a cooperating presser-foot having a work-engaging face, stitch-forming mechanism including thread carrying and loop-handling devices operatively supported on opposite sides of the work-engaging face of said presser-foot, the support for the loop-handling device being controlled by the presser-foot so as to be moved thereby, mechanism for operating said thread-carrying and loop-handling devices, and means solely controlled by the presser-foot connecting a part of the mechanism operating said thread-carrying device with the presser-foot for establishing and maintaining substantially the same definite cooperative relation between the thread-carrying and loop-handling devices when the presser-foot shifts, said thread carrying device at the lower end of its stroke arriving at substantially the same position notwithstanding variations in the length of the stroke to suit different thicknesses of work.

6. In a sewing machine, in combination, a work-feeding member, a cooperating presser-foot having a work-engaging face, stitch-forming mechanism including thread-carrying and loop-handling devices operatively supported on opposite sides of the work-engaging face of said presser-foot, the support for the loop-handling device being controlled by the presser-foot so as to be moved thereby, mechanism for operating said thread-carrying and loop-handling devices, and means solely controlled by the presser-foot connecting a part of the mechanism operating said thread-carrying device with the presser-foot for establishing and maintaining substantially the same definite cooperative relation between the thread-carrying and loop-handling devices when the presser-foot shifts, said means consisting of a linkage directly connecting the presser-foot with a part of the needle-operating mechanism.

7. In a sewing machine, in combination, means for feeding the work, a presser-foot, stitch-forming mechanism including needles and loopers operatively supported on opposite sides of the work, mechanism for operating said needles and loopers, and means controlled solely by the presser-foot for altering and for holding in altered position the needle-operating mechanism whereby the upper limit of the needle's stroke may be varied to maintain a definite cooperative relation between the loopers and the needles with different thicknesses of work, said loopers having a bodily rising and falling movement governed by the movement of the presser-foot.

8. In a sewing machine, in combination, means for feeding the work, a presser-foot, stitch-forming mechanism including needles and loopers operatively supported on opposite sides of the work, mechanism for operating said needles and loopers, and means for varying the throw of the needles controlled by the thickness of the work, said means acting to clamp the presser-foot down upon the work when the needles enter the work, and said loopers having their operative positions determined by the thickness of the work.

9. In a sewing machine, in combination, means for feeding the work including a presser-foot, and stitch-forming mechanism including an eye-pointed needle and a hooked needle operatively supported below the presser-foot and loopers operatively supported in angular relation above and by the presser-foot, means for operating said needles and loopers, and controlling means for altering the needle operating mechanism to vary the upward limit of the stroke of the needles to suit the loopers when shifted with the presser-foot, said controlling means being governed solely by said presser-foot and serving to hold the needle-operating mechanism in the altered condition determined by the presser-foot when the needles enter the goods.

10. In a sewing machine, in combination, feeding mechanism including a presser-foot, stitch-forming mechanism including needles operatively supported below and loopers operatively supported above and by said presser-foot, a work-rest, an arm overhanging said work-rest with a free end above the stitching point and supported at the end of said work-rest remote from said stitching point, a main-shaft located below said work-rest, needle-operating mechanism actuated by said main-shaft below said work-rest, a shaft housed within said overhanging arm and driven by said main-shaft, and looper operating mechanism actuated by said last named shaft, whereby the space under the overhanging arm is rendered free and clear.

11. In a sewing machine, in combination, work-feeding mechanism including a spring pressed presser-foot, stitch-forming mechanism including needles and loopers operatively supported below and above respectively the presser-foot, mechanism for actuating said needles and loopers, means whereby the loopers are lifted with the presser-foot and means connecting a part of the needle-actuating mechanism with the presser-foot for making the needles at the upper end of their stroke follow the loopers when the presser-foot is lifted, said means acting in the same direction as the presser-foot spring to resist the thrust of the needles on entering the work.

12. In combination in a sewing machine, a work-rest, an overhanging arm, work-feeding mechanism, a main-shaft, a rock-shaft supported by said overhanging arm and driven from said main-shaft, a presser-foot, a member slidably mounted in said overhanging arm and fixed to said presser-foot, stitch-forming mechanism including needles operatively arranged below the work-rest and loopers supported by the member carrying said presser-foot, said loopers being bodily movable with and independently of said presser-foot, mechanism for operating said needles from said main-shaft, and mechanism for operating said loopers from said rock-shaft.

13. In a straw-braid sewing machine, in combination, work-feeding mechanism including a feed-dog, stitch-forming mechanism including eye-pointed and hooked needles operated from the same side of the work as the feed-dog and loopers operated from the opposite side of the work, a presser-foot, a sliding member supporting said presser-foot, mechanism arranged in said sliding member for operating said loopers in intersecting planes, a work-rest. an arm overhanging said work-rest, a looper actuating shaft journaled on said overhanging arm, means for operating said shaft, and connections between said looper actuating shaft and said looper operating mechanism.

14. In a straw-braid sewing machine, in combination, a work-rest, an arm overhanging said work-rest and supporting a rock-shaft, means for turning said rock-shaft, a presser-foot, a member fixed to said presser-foot and arranged to slide in said overhanging arm, work-feeding mechanism, stitch-forming mechanism including eye-pointed and hooked needles and cooperating loopers, levers having transversely arranged fulcra fixed in said member and carrying said loopers whereby they may be swung in intersecting paths, and means for actuating said levers from said rock-shaft including a sliding connection.

15. In a straw-braid sewing machine, in combination, a work-rest, an arm overhanging said work-rest and supporting a rock-shaft, means for turning said rock-shaft, a presser-foot, a member fixed to said presser-foot and arranged to slide in said overhanging arm, work feeding mechanism, stitch-forming mechanism including eye-pointed and hooked needles and cooperating levers, levers having transversely arranged fulcra fixed to said member and carrying said loopers whereby they may be swung in intersecting paths, means for moving one of said levers from the rock-shaft, and means for swinging the other of said levers from the first mentioned lever.

16. In a straw-braid sewing machine having a work-rest and an overhanging arm, in combination, work-feeding mechanism, stitch-forming mechanism including needles and loopers operatively mounted on opposite sides of the work-rest, mechanism for imparting to said needles and loopers coordinated movements for the formation of stitches, a presser-foot, said loopers being arranged to move up and down with said presser-foot, and a linkage connecting said presser-foot with a part of the needle-actuating mechanism for varying the length of stroke of the needles, said linkage including a yieldable link, and a stop for limiting the action of the linkage whereby elevation of the presser-foot above a predetermined point will not alter the needle-actuating mechanism.

17. In a straw-braid sewing machine having a work-rest and an overhanging arm, a main-shaft supported beneath the work-rest, an eccentric on said main-shaft, an actuating slotted rocker having a fixed fulcrum below said main-shaft, an eccentric strap between said eccentric and said actuating slotted rocker for imparting movement thereto, a sliding block fitted in the slot of said rocker, means for adjusting said sliding block different distances from the fulcrum of said rocker, a needle slide bar, and a link connecting said needle slide bar and said slide-block.

18. In a straw-braid sewing machine, a work-support, an overhanging arm, a main-shaft located below said work-support, work feeding mechanism operatively supported below said work-support, a slide-bar operatively arranged below said work-support, needles fixed to said slide-bar, mechanism for operating said slide-bar from said main-shaft, said mechanism being located below and adjacent the stitching point, a presser-foot having a work-engaging face, loopers supported above said face of the presser-foot and movable bodily with the presser-foot, and mechanism for operating said loopers.

19. In a needle-bar operating mechanism for sewing machines having needles arranged to enter the work from its lower side, a main-shaft, an eccentric thereon, a needle-bar reciprocating in a rectilinear path, a rocker having a fixed fulcrum at one end and a curved slot in its opposite free end, a pitman embracing said eccentric and connected to said rocker between the curved slot and the fixed fulcrum, a slide block tracking said curved slot, a link connecting said slide block with said needle-bar and of a length equal to the radius of curvature of the slot in said rocker, and means for shifting said slide block to vary the throw of the needles.

20. In a straw-braid sewing machine, a main-frame including a work support and an arm overhanging said work-support, a presser-foot slidably mounted in said overhanging arm, loopers supported on said presser-foot so as to shift therewith, a main shaft below said work-support, needles actuated from said main-shaft and operatively supported with their points directed upwardly, looper operating mechanism between said main shaft and said loopers, and automatic controlling mechanism for increasing the stroke of the needles as the presser-foot is raised.

21. In a straw-braid sewing machine, the combination with hook and eyed needles disposed one in advance of the other in the line of seam-formation, of a pair of loopers, a pair of looper-levers each carrying its respective looper, said levers being fulcrumed so as to confine said loopers to move in intersecting planes, one at the side of the needles and the other between the needles, a rockshaft, and means on said shaft and connections for actuating said looper-levers.

22. In a looper-operating mechanism for sewing machines, a presser-foot, a member carrying said presser-foot, a pair of transversely disposed pins in said member, levers fulcrumed on said pins for vibration in intersecting planes, means for vibrating one of said levers and therethrough the other, and an adjustable connection between said levers whereby timing and clearance of the loopers may be obtained.

23. In a stitch-forming mechanism for sewing machines, a pair of needles, means for actuating the same, a presser-foot, a member carrying said presser-foot, a pair of transversely disposed pins in said member, levers fulcrumed on said pins for vibration in intersecting planes, loopers on said levers cooperating with said needles to form a chain-stitch, means for vibrating one of said levers, and connections between said levers whereby the vibration of one will synchronously vibrate the other.

24. In a looper-operating mechanism for sewing machines, a presser-foot, a member carrying said presser-foot, a pair of transversely disposed pins in said member, levers fulcrumed on said pins for vibration in intersecting planes, means for vibrating one of said levers and therethrough the other, and a link connected to each of said levers by a ball-and-socket joint.

25. In a looper-operating mechanism for sewing machines, a presser-foot, a member carrying said presser-foot, a pair of transversely disposed pins in said member, levers fulcrumed on said pins for vibration in intersecting planes, means for vibrating one of said levers, and a link connecting said levers and having socket-end-sections and an intermediate oppositely threaded section adjustably connecting the end sections.

26. In a sewing machine, in combination, means for feeding the work, a presser-foot, stitch-forming mechanism including needles and loopers operatively supported on opposite sides of the work, mechanism for operating said needles and loopers and means controlled solely by the presser-foot for maintaining a definite cooperative relation between the loopers and the nedles with different thicknesses of work, said loopers having a bodily rising and falling movement governed by the movement of the presser-foot.

27. In a sewing machine, in combination, means for feeding the work, a presser-foot, stitch-forming mechanism including needles and loopers operatively supported on opposite sides of the work, mechanism for operating said needles and loopers, and means for varying the throw of the needles controlled solely by the thickness of the work, and said loopers having their operative positions determined by the thickness of the work.

28. In a sewing machine, in combination, means for feeding the work, a presser-foot, needles and loopers operatively supported on opposite sides of the work, a slide-bar carrying said needles, mechanism for operating said needles including an adjustable part and a link connecting said adjustable part to said slide-bar, controller mechanism governed by the thickness of the work and also connected to said adjustable part of the needle operating mechanism for maintaining a definite cooperative relation between the loopers and the needles as the thickness of the work varies, said loopers having a bodily rising and falling movement governed by the thickness of the work.

29. In a sewing machine having an overhanging bracket-arm terminating in a head, an operating shaft sustained by said bracket-arm, a crank on the end of said shaft nearest said head, and stitch-forming mechanism including pairs of upwardly directed needles and loopers, said loopers being actuated from said crank and in intersecting planes to cooperate with the needles in the formation of stitches.

30. In a sewing machine having an overhanging bracket-arm terminating in a head, a rock-shaft sustained by said bracket-arm and having a crank adjacent the head, and stitch-forming mechanism including pairs of upwardly directed needles and loopers, said loopers being actuated from said crank for cooperation with the needles in the formation of stitches.

31. In a sewing machine having an overhanging bracket-arm terminating in a head, an operating shaft sustained by said bracket-arm, a crank on the end of said shaft nearest said head, and stitch-forming mechanism including pairs of upwardly directed needles and loopers, said loopers being actuated from said crank and in intersecting planes to cooperate with the needles in the formation of stitches and being actuated through a sliding connection with said crank.

32. In a sewing machine having an overhanging bracket-arm terminating in a head, an operating shaft sustained by said bracket-arm, a crank on the end of said shaft nearest said head, and stitch-forming mechanism including pairs of upwardly directed needles and cooperating loopers, levers carrying each of said loopers, and means connected with the crank for vibrating said looper carrying levers in intersecting planes parallel with the paths of the needles.

33. In a sewing machine having an overhanging bracket-arm terminating in a head, an operating shaft sustained by said bracket-arm, a crank on the end of said shaft nearest said head, and stitch-forming mechanism including pairs of upwardly directed needles and loopers, said loopers being actuated from said crank and in intersecting planes parallel with the paths of the needles for cooperation with the latter in the formation of stitches.

34. In a sewing machine, in combination, stitch-forming mechanism including an eyed-needle and a hooked-needle, a presser-foot, a pair of loopers whose cooperative relation with the needles is governed by the presser-foot, and mechanism for operating the needles including a common carrier therefor, means for actuating the carrier, and means for increasing the stroke of the needles to maintain them in cooperative relation with the loopers, the lower limit of the needle's stroke being fixed and invariable.

35. In a sewing machine having hook and eyed needles, a pair of loopers cooperating with the needles to form a chain-stitch, mechanism for actuating said loopers including a rotary driving element, a stationary element having a circular face eccentric of the axis of rotation of the driving element, a driven member pivoted eccentrically to the rotary driving element and linked to the stationary element, and operative connections between said driven member and the loopers, whereby thread may be transferred rapidly from the eyed to the hooked needle at one end of the loopers movement.

36. In a sewing machine having hook and eyed needles, a pair of loopers cooperating with the needles to form a chain-stitch, a support for said loopers in the head of the machine, a rock-shaft, a rotary driving shaft, connections between the loopers and the rock-shaft, a compound eccentric mechanism on the rotary driving shaft, and means for transmitting motion from the compound eccentric to the rock-shaft.

37. In a sewing machine having hook and eyed needles, a pair of loopers cooperating with the needles and operatively supported for vibration in intersecting planes, a slidable carrier supporting said loopers and adapted to be shifted by variations in the thickness of the work, compound eccentric mechanism for actuating the loopers, and a sliding connection between the compound eccentric mechanism and the loopers.

38. In a sewing machine having hook and eyed needles, a pair of loopers cooperating with the needles in the formation of a chain-stitch and operatively supported for vibration in intersecting planes, and a compound actuating eccentric and connections for operating said loopers.

39. In a sewing machine having hook and eyed needles, a pair of loopers cooperating with the needles and operatively supported for vibration in intersecting planes, means for actuating the one looper from the other, and a compound eccentric mechanism for actuating the other looper.

40. In a straw-braid sewing machine having hook and eyed needles a pair of loopers cooperating with said needles and mounted for movement in intersecting paths, a driving shaft, a driving element on said shaft, an element driven by said driving element, and connecting means between said driven element and said loopers for driving the latter.

41. In a straw-braid sewing machine having hook and eyed needles, a pair of loopers cooperating with said needles and mounted for movement in intersecting paths, a driving shaft, a compound eccentric on said driving shaft, a pitman actuated by said compound eccentric, and connecting means between said pitman and said loopers for driving the latter.

42. A sewing machine having a looper and operating mechanism therefor including a rotary shaft, a rotary element driven by said shaft, a stationary actuating element arranged eccentrically of said shaft, an eccentric disk driven by the rotary element and adapted to be shifted by the stationary element, said stationary element being adjustable about the axis of the shaft and a driving connection from the eccentric disk to the looper.

43. In a sewing machine, in combination, means for feeding the work, a presser-foot, stitch-forming mechanism including a needle and loop-handling means, mechanism for operating said needle and loop-handling means, and means controlled solely by the presser-foot for altering and holding in altered position the needle operating mechanism whereby the needle's stroke may be varied to maintain a definite cooperative relation between the loop-handling means and the needle with different thicknesses of work, said loop-handling means having a bodily movement governed by the movement of the presser-foot.

44. In a sewing machine, in combination, means for feeding the work, a presser-foot, stitch-forming mechanism including a needle and loop-handling means, mechanism for operating said needle and loop-handling means and means for varying the throw of the needle controlled by the thickness of the work, said means acting to press the presser-foot against the work when the needle enters the work, and said loop-handling means having its operative position determined by the thickness of the work.

45. In a sewing machine, in combination, a work-feeding mechanism including a presser-foot, means for urging the presser-foot against the work, stitch-forming mechanism including a needle, and loop-handling means operatively supported respectively below and above the work, means for actuating said needle and loop-handling means, means whereby the loop-handling means is lifted with the presser-foot, and means connecting a part of the needle actuating mechanism with the presser-foot for causing the needle at the upper end of its stroke to follow the loop-handling means when the presser-foot is lifted, said means acting in the same direction as the presser-foot urging means to resist the thrust of the needle on entering the work.

46. In a sewing machine, a main-frame including a work-support and an arm overhanging said work-support, a presser-foot shiftably sustained by said overhanging arm, loop-handling means mounted so as to shift with the presser-foot, a main shaft below said work-support, a needle actuated from said main-shaft and operatively supported with its point directed upwardly, operating mechanism between the main-shaft and the loop-handling means, and automatic controlling mechanism for increasing the stroke of the needle as the presser-foot is raised.

47. In a sewing machine, in combination, means for feeding the work, a presser-foot, stitch-forming mechanism including a needle and loop-handling means operatively supported on opposite sides of the work, means for operating said needle and loop-handling means, means for varying the throw of the needle controlled solely by the thickness of the work, and the loop-handling means being so mounted that its operative positions are determined by the thickness of the work.

48. A sewing machine having stitch-forming mechanism including a plurality of loopers mounted for actuation in intersecting planes, operating means therefor including a rotary eccentric, means for varying its eccentricity during each cycle of operation, and a driving connection from the eccentric to the loopers.

49. A sewing machine having stitch-forming mechanism including a plurality of loopers mounted for actuation in intersecting planes, operating means therefor including a rotary shaft, a rotary element driven by the shaft, a stationary actuating element arranged eccentrically of said shaft, an eccentric disk driven by said rotary element and adapted to be shifted by the stationary element, and a driving connection from the eccentric disk to the loopers.

50. A sewing machine having stitch-forming mechanism including a plurality of loopers mounted for actuation in intersecting planes, operating means therefor including a rotary shaft, a rotary element driven by the shaft, a stationary actuating element arranged eccentrically of said shaft, means whereby said stationary actuating element may be adjusted about the axis of the shaft, an eccentric disk driven by said rotary element and adapted to be shifted by the stationary element, and a driving connection from the eccentric disk to the loopers.

51. In a straw-braid sewing machine, the combination with hook and eyed needles disposed one in advance of the other in the line of seam-formation, of a pair of loopers, a pair of looper-levers each carrying its respective looper, said levers being fulcrumed so as to confine said loopers to move in intersecting planes, one at the side of the needles and the other between the needles, a rock-shaft having a crank-arm, and means having a single connection with said crank-arm for actuating said looper-levers.

52. A sewing machine having stitch-forming mechanism including a plurality of loopers mounted for actuation in intersecting planes, a rock-shaft, means connected with the rock-shaft for operating said loopers, work-feeding means, and a presser-foot having connection with the loopers whereby they maintain a given relation with the surface of the work as the thickness thereof varies.

53. A sewing machine comprising stitch-forming mechanism including a needle and loop-handling means, a presser-foot, work-feeding means, a main-shaft, an eccentric on the main-shaft having driving connection with the needle, an eccentric on the shaft for operating the feeding means, an eccentric on the shaft from which solely the loop-handling means derives its operative movements, and means having connection with the presser-foot whereby the stroke of the needle is varied as the thickness of the work varies.

54. A sewing machine comprising stitch-forming mechanism including a needle and loop-handling means, a presser-foot, work feeding means, a main-shaft, an eccentric on the main-shaft having driving connection with the needle, an eccentric on the shaft for operating the feeding means, an eccentric on the shaft from which solely the loop-handling means derives its operative movements, said loop-handling means being so connected with the presser-foot that it maintains a substantially given relation with the surface of the work as the thickness thereof varies.

55. A sewing machine comprising stitch-forming mechanism including a needle and loop-handling means, a presser-foot, work-feeding means, a main-shaft, an eccentric on the main-shaft having driving connection with the needle, an eccentric on the shaft for operating the feeding means, an eccentric on the shaft from which solely the loop-handling means derives its operative movements, said loop-handling means being so connected with the presser-foot that it maintains a substantially given relation with the surface of the work as the thickness thereof varies, and means having connection with the presser-foot whereby the stroke of the needle is varied as the thickness of the work varies.

56. In a sewing machine, in combination, stitch-forming mechanism including a needle, a movable work-engaging element, mechanism for operating said needle, and means for varying the throw of the needle including a movable member, said member connected to and free to follow the movements of said work-engaging element at all times during the cycle of operations.

57. In a sewing machine, in combination, work-feeding means, a presser-foot, stitch-forming mechanism including thread-carrying and loop-handling means, means for operating said thread-carrying and loop-handling means, and means connected to and free to follow the movements of the presser-foot at all times during the cycle of operation for varying the throw of the thread-carrying means.

58. In a sewing machine, in combination, stitch-forming mechanism including a needle, a presser-foot, means for operating the needle, means for varying the throw of the needle and means for positively connecting the presser-foot and the means for varying the throw of the needle whereby the throw of the needle will vary as the position of the presser-foot varies and the reaction of the needle thrust as it enters the work will be transmitted to the presser-foot.

59. In a sewing machine, in combination, means for feeding the work, a presser-foot, stitch-forming mechanism including thread-carrying and loop-handling means operatively supported on opposite sides of the work, means for operating the thread-carrying and loop-handling means, means for varying the throw of the thread-carrying means, and a positive connection between the presser-foot and the means for varying the throw of the thread-carrying means whereby the throw of the thread-carrying means varies as the presser-foot shifts and the reaction of the needle thrust as it enters the work will be transmitted to the presser-foot.

60. A straw-braid sewing machine comprising stitch-forming mechanism including an eyed needle and a hooked needle and loop-handling means cooperating therewith comprising a plurality of loopers mounted for actuation in intersecting planes, a presser-foot, work-feeding means, means for actuating said needles, an eccentric for operating said loop-handling means, and means having connection with the presser-foot whereby the stroke of the needles is varied as the thickness of the work varies.

61. A straw-braid sewing machine comprising stitch-forming mechanism including an eyed needle and a hooked needle and loop-handling means cooperating therewith comprising a plurality of loopers mounted for actuation in intersecting planes, a presser-foot, work-feeding means, means for actuating said needles, an eccentric for operating said loop-handling means, said loop-handling means being so connected with the presser-foot that it maintains a substantially given relation with the surface of the work as the thickness thereof varies.

62. A straw-braid sewing machine comprising stitch-forming mechanism including an eyed needle and a hooked needle and loop-handling means cooperating therewith comprising a plurality of loopers mounted for actuation in intersecting planes, a presser-foot, work-feeding means, means for actuating said needles, an eccentric for operating said loop-handling means, said loop-handling means being so connected with the presser-foot that it maintains a substantially given relation with the surface of the work as the thickness thereof varies, and means having connection with the presser-foot whereby the stroke of the needles is varied as the thickness of the work varies.

63. In a straw-braid sewing machine having stitch-forming mechanism including parallel eyed and hooked needles, a plurality of loopers cooperating with said needles and mounted for actuation in intersecting planes, and an eccentric for operating said loopers.

64. In a straw-braid sewing machine, stitch-forming mechanism including an eyed needle and a hooked needle, means for operating said needles, thread-handling means cooperating with said needles comprising a plurality of loopers mounted for movement in intersecting planes, means for operating said loopers including an eccentric, means for varying its eccentricity during each cycle of operation, and a driving connection from the eccentric to the loopers.

65. A sewing machine having stitch-forming mechanism including a plurality of loopers mounted for actuation in intersecting planes, operating mechanism for said loopers including an eccentric, means for varying its eccentricity during each cycle of operation, and an operative connection from said eccentric to the loopers.

In testimony whereof, I have signed my name to this specification.

RUDOLPH BECKER.